US009182819B2

(12) United States Patent
Strupczewski et al.

(10) Patent No.: US 9,182,819 B2
(45) Date of Patent: Nov. 10, 2015

(54) EYE GAZE TRACKING METHOD AND APPARATUS AND COMPUTER-READABLE RECORDING MEDIUM

(71) Applicant: Samsung Electronics Co., Ltd., Suwon-si, Gyeonggi-do (KR)

(72) Inventors: Adam Strupczewski, Warsaw (PL); Jacek Naruniec, Warsaw (PL); Kamil Mucha, Warsaw (PL); Blazej Czuprynski, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/543,213

(22) Filed: Nov. 17, 2014

(65) Prior Publication Data
US 2015/0293588 A1 Oct. 15, 2015

(30) Foreign Application Priority Data

Apr. 10, 2014 (KR) ........................ 10-2014-0043205

(51) Int. Cl.
*G06K 9/00* (2006.01)
*G06F 3/01* (2006.01)
*G06T 17/00* (2006.01)

(52) U.S. Cl.
CPC ............ *G06F 3/013* (2013.01); *G06K 9/00228* (2013.01); *G06K 9/00597* (2013.01); *G06T 17/00* (2013.01)

(58) Field of Classification Search
CPC combination set(s) only.
See application file for complete search history.

(56) References Cited

U.S. PATENT DOCUMENTS

| 6,152,563 | A | 11/2000 | Hutchinson et al. |
| 6,154,559 | A * | 11/2000 | Beardsley ............... A61B 3/113 340/576 |
| 6,246,779 | B1 | 6/2001 | Fukui et al. |
| 6,578,962 | B1 * | 6/2003 | Amir .................... G06K 9/0061 345/157 |
| 6,758,563 | B2 | 7/2004 | Levola |
| 7,043,056 | B2 | 5/2006 | Edwards et al. |
| 7,197,165 | B2 * | 3/2007 | Ryan ....................... G06F 3/013 382/103 |

(Continued)

FOREIGN PATENT DOCUMENTS

| EP | 2306891 A1 | 4/2011 |
| EP | 1691670 B1 | 7/2014 |

(Continued)

OTHER PUBLICATIONS

Jing Xiao, Tsuyoshi Moriyama, Takeo Kanade, and Jeffrey Cohn, "Robust Full-Motion Recovery of Head by Dynamic Templates and Re-registration Techniques," International Journal of Imaging Systems and Technology, vol. 13, Sep. 2003, pp. 85-94.

(Continued)

*Primary Examiner* — Anand Bhatnagar
(74) *Attorney, Agent, or Firm* — Jefferson IP Law, LLP

(57) ABSTRACT

A method and an apparatus of tracking an eye gaze to determine where a gaze point of a user is located on a display unit of a device, based on a facial pose and a position of an iris center, are provided. The method includes detecting a facial feature in a captured initial image, three-dimensionally modeling the detected facial feature, tracking the three-dimensionally modeled facial feature in consecutively captured images, detecting an iris center in the consecutively captured images, acquiring an eye gaze vector based on the tracked three-dimensionally modeled facial feature and the detected iris center, and acquiring a gaze point on a display unit based on the eye gaze vector.

23 Claims, 7 Drawing Sheets

(56) References Cited

U.S. PATENT DOCUMENTS

| | | | | |
|---|---|---|---|---|
| 7,306,337 | B2* | 12/2007 | Ji | G06F 3/013 351/209 |
| 7,862,172 | B2 | 1/2011 | Yoshinaga et al. | |
| 8,077,217 | B2* | 12/2011 | Miyamoto | A61B 3/113 348/222.1 |
| 8,107,688 | B2* | 1/2012 | Kozakaya | G06K 9/00221 382/117 |
| 8,235,529 | B1 | 8/2012 | Raffle et al. | |
| 8,331,993 | B2 | 12/2012 | Lee et al. | |
| 8,360,578 | B2* | 1/2013 | Nummela | A61B 3/113 351/209 |
| 8,406,479 | B2 | 3/2013 | Tsukizawa | |
| 8,678,589 | B2* | 3/2014 | Sakata | G06K 9/0061 351/209 |
| 8,879,801 | B2* | 11/2014 | Ragland | G06F 3/011 351/209 |
| 8,885,882 | B1* | 11/2014 | Yin | G06F 3/00 382/103 |
| 8,888,287 | B2* | 11/2014 | Yahav | G02B 27/01 351/209 |
| 2003/0169907 | A1* | 9/2003 | Edwards | G06K 9/00248 382/118 |
| 2011/0109880 | A1* | 5/2011 | Nummela | A61B 3/113 351/210 |
| 2012/0293635 | A1* | 11/2012 | Sharma | G06K 9/00234 348/50 |
| 2013/0083976 | A1* | 4/2013 | Ragland | G06F 3/011 382/117 |
| 2013/0178287 | A1* | 7/2013 | Yahav | G02B 27/01 463/32 |

FOREIGN PATENT DOCUMENTS

| | | |
|---|---|---|
| KR | 10-2011-0076723 A | 7/2011 |
| WO | 2010-003410 A1 | 1/2010 |

OTHER PUBLICATIONS

Zuhong Zhou, Peng Yao, Zhenquan Zhuang, Jun Li, "A robust algorithm for iris localisation based on radial symmetry and circular integro differential operator", 6th IEEE Conference on Industrial Electronics and Applications (ICIEA), Jun. 21-23, 201, pp. 1742-1745.

Iain Matthews and Simon Baker, "Active Appearance Models Revisited," International Journal of Computer Vision, vol. 60, No. 2, Nov. 2004, pp. 135-164. (Example AAM implementation).

Roberto Valenti, Nicu Sebe, Theo Gevers: Combining Head Pose and Eye Location Information for Gaze Estimation. IEEE Transactions on Image Processing 21(2): 802-815 (2012). (Geometrical eye gaze tracking having similarities with our method).

Aga Bojko, "The Truth About Webcam Eye Tracking" Oct. 13, 2011 (Article on webcam eye gaze tracking comparison) http://www.usercentric.com/blogs/uxnuggets/2011/10/13/truth-about-webcam-eye-tracking.

Jiří Matas and Tomáš Vojíř, "Robustifying the Flock of Trackers", Feb. 2-4, 2011 http://cmp.felk.cvut.cz/~vojirtom/publications/cvww2011.pdf.

Arne John Glenstrup, Theo Engell-Nielsen, "Eye Controlled Media: Present and Future State", Thesis for the Partial Fulfilment of the Requirements for a Bachelor's Degree in Information Psychology at the Laboratory of Psychology, University of Copenhagen, Jun. 1, 1995 http://www.diku.dk/~panic/eyegaze/article.html.

* cited by examiner

EYE GAZE TRACKING METHOD AND APPARATUS AND COMPUTER-READABLE RECORDING MEDIUM

CROSS-REFERENCE TO RELATED APPLICATION(S)

This application claims the benefit under 35 U.S.C. §119 (a) of a Korean patent application filed on Apr. 10, 2014 in the Korean Intellectual Property Office and assigned Serial number No. 10-2014-0043205, the entire disclosure of which is hereby incorporated herein by reference.

TECHNICAL FIELD

The present disclosure relates to eye gaze tracking methods and apparatuses and computer-readable recording media storing the eye gaze tracking methods. More particularly, the present disclosure relates to methods of determining where a gaze point of a user is located on a display unit of a device based on a facial pose and a position of an iris center.

BACKGROUND

An eye gaze tracking technique is a technique for tracking an object seen by a user to detect a point to which a user's pupils are directed. Recently, the application of eye gaze tracking techniques has been extended with the development of human interface techniques, as the eye gaze tracking technique is intuitive and convenient. basis Recently, a video-based eye gaze tracking method based on image processing has been widely used. The eye gaze tracking method uses a method of acquiring an eye image through a camera and analyzing a gaze direction of an eyeball by image analysis. In this case, a scheme based on a stereo a vision-based depth camera, an InfraRed (IR) camera, and an illumination device may be used for accurate eye gaze tracking.

However, the scheme based on an IR camera is not economical because it requires additional expensive equipment in order to achieve satisfactory quality.

Some companies (e.g., EyeTrackShop and GazeHawk) present an eye gaze tracking method that does not use expensive equipment, but this eye gaze tracking method has limitations on use and needs extensive calibration, and may not achieve sufficient accuracy.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for determining where a gaze point of a user is located on a display unit of a device, based on a facial pose and a position of an iris center, and computer-readable recording media storing the eye gaze tracking methods.

Hereinafter, basic aspects for a better understanding of the embodiments of the present disclosure are provided in summary. This summary is not an extensive overview of all considered aspects and is not intended to identify important or critical elements of all aspects and to accurately describe the scope of some or all aspects. The purpose of this is to briefly present some concepts of the aspects as the introduction of the detailed description of the embodiments of the present disclosure.

Additional aspects will be set forth in part in the description which follows and, in part, will be apparent from the description, or may be learned by practice of the presented embodiments.

In accordance with an aspect of the present disclosure, an eye gaze tracking method is provided. The method includes detecting a facial feature in a captured initial image, three-dimensionally modeling the detected facial feature, tracking the three-dimensionally modeled facial feature in consecutively captured images, detecting an iris center in the consecutively captured images, acquiring an eye gaze vector based on the tracked three-dimensionally modeled facial feature and the detected iris center, and acquiring a gaze point on a display unit based on the eye gaze vector.

In accordance with another aspect of the present disclosure, an eye gaze tracking apparatus is provided. The apparatus includes a facial feature detecting unit configured to detect a facial feature in a captured initial image, a facial feature tracking unit configured to three-dimensionally model the detected facial feature and to track the three-dimensionally modeled facial feature in consecutively captured images, an iris center detecting unit configured to detect an iris center in the consecutively captured images, and an eye gaze tracking unit configured to acquire an eye gaze vector based on the tracked three-dimensionally modeled facial feature and the detected iris center and to acquire a gaze point on a display unit based on the eye gaze vector.

In accordance with another aspect of the present disclosure, a computer-readable recording medium configured to store computer-readable instructions that, when executed by a computer, perform the above-described eye gaze tracking method.

The above aspects will be fully described later and will include features stated in the claims. The following descriptions and the accompanying drawings present aspects in more detail. However, these aspects represent some of various methods in which the principle of various aspects may be used, and the described aspects should be construed as including all of such aspects and equivalents thereof.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
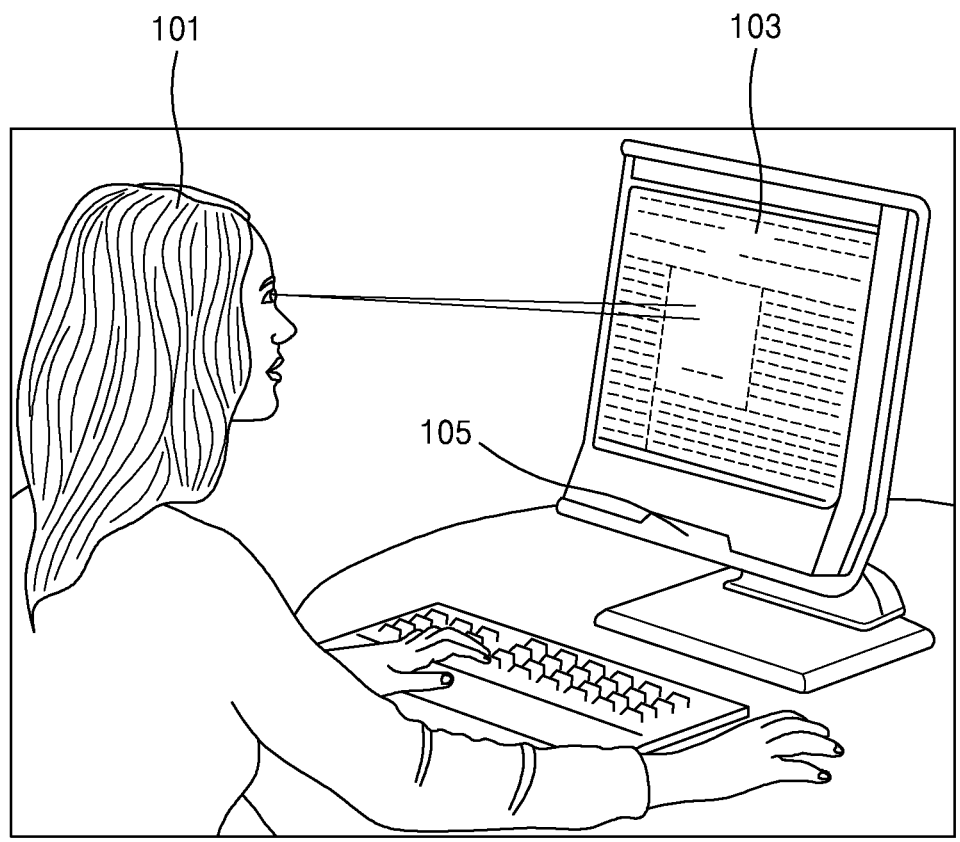
FIG. 1 illustrates an eye gaze tracking apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The terms used in the specification will be briefly described, and embodiments of the present disclosure will be described in detail.

The terms used in this specification are those general terms currently widely used in the art in consideration of functions in regard to embodiments of the present disclosure, but the terms may vary according to the intention of those of ordinary skill in the art, precedents, or new technology in the art. Also, specified terms may be selected, and in this case, the detailed meaning thereof will be described in the detailed description of embodiments of the present disclosure. Thus, the terms used in the specification should be understood not as simple names but based on the meaning of the terms and the overall description of embodiments of the present disclosure.

When something "comprises" or "includes" a component, another component may be further included unless specified otherwise. Also, the terms "unit" and "module" used herein refer to units specially configured to process at least one function or operation, and they may be implemented by hardware, software, or any combination thereof.

Reference will now be made to embodiments of the present disclosure, examples of which are illustrated in the accompanying drawings. In this regard, the present embodiments may have different forms and should not be construed as being limited to the descriptions set forth herein. While describing one or more embodiments of the present disclosure, descriptions about drawings that are not related to the one or more embodiments of the present disclosure are omitted.

Eye gaze tracking is useful in various devices such as laptop computers and smartphones. For example, the eye gaze tracking may control a mouse cursor with the eyes in combination with a predetermined gesture and may control presentation and multimedia by the eyes alone. For example, the eye gaze tracking may provide an automatic function such as automatic page scrolling according to the movement of eyes of a user when reading text, may profile the user by determining which User Interface (UI) the user gazes at and which advertisement the user sees, and may assist the user that is unable to use his hands. Hereinafter, inexpensive and accurate eye gaze tracking methods and apparatuses according to embodiments of the present disclosure will be described.

FIG. 1 illustrates an eye gaze tracking apparatus according to an embodiment of the present disclosure.

Referring to FIG. 1, an eye gaze tracking apparatus according to an embodiment of the present disclosure includes a display unit (e.g., monitor) 103 and a photographing unit (e.g., webcam) 105. For example, FIG. 1 illustrates a configuration for tracking a gaze point of a user 101 on the display unit 103 by using the photographing unit 105. As illustrated in FIG. 1, the eye gaze tracking apparatus may be implemented in a general Personal Computer (PC) equipped with the display unit 103 and the photographing unit 105. However, embodiments of the present disclosure are not limited thereto, and for example, the eye gaze tracking apparatus may be implemented in a smartphone equipped with a front camera, a video phone, a smart TeleVision (TV), and similar apparatuses equipped with a display unit and a photographing unit. The photographing unit 105 may be disposed in front of the user 101 to photograph a face of the user 101 that gazes at the display unit 103.

Figure 2:
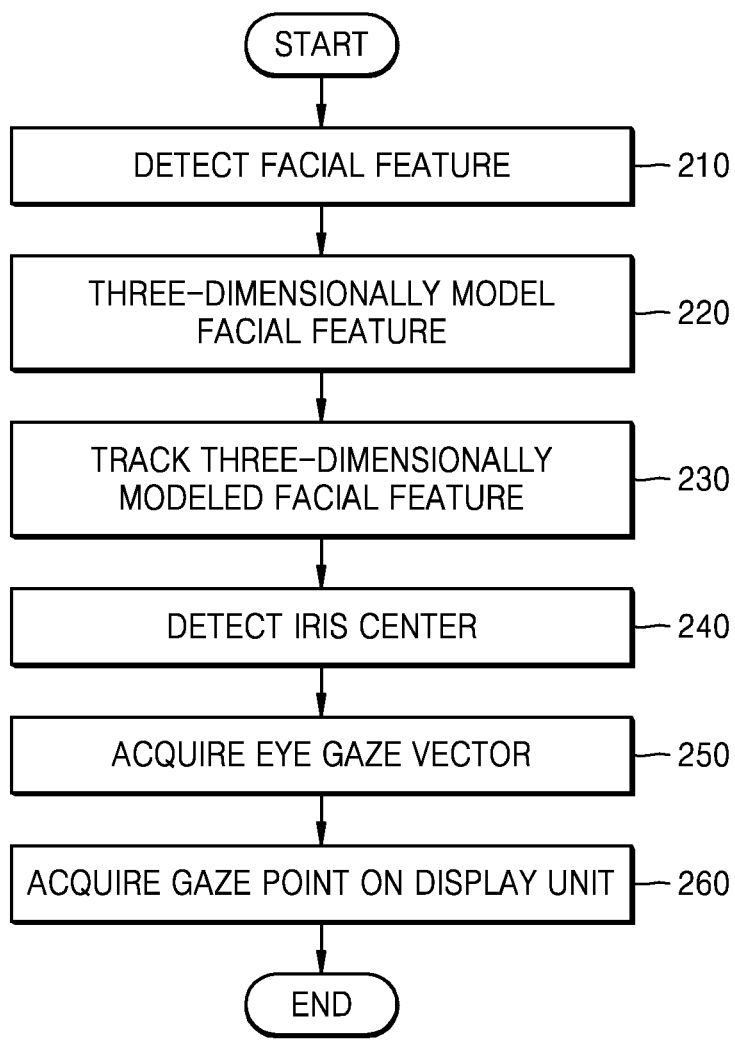
FIG. 2 is a flowchart of a method for acquiring a gaze point of a user on a display unit according to an embodiment of the present disclosure.

FIG. 2 is a flowchart of a method for acquiring a gaze point of the user on the display unit 103 according to an embodiment of the present disclosure.

Referring to FIG. 2, in operation 210, the eye gaze tracking apparatus, which has received an input of an image captured by using the photographing unit 105, detects a facial feature based on the captured image. For example, the facial feature may be, but is not limited to, an eye region, a nose region, or a mouth region. An Active Appearance Model (AAM) may be used to detect the facial feature. Since facial feature detection may be difficult if the user moves, the eye gaze tracking apparatus may display a message requesting the user not to move. The message requesting the user not to move may be provided in the form of a sound, an image, text, or the like. For example, along with the output of a voice, a point may be displayed on the display unit 103 so that the user may gaze at the point on the display unit 103.

In operation 220, the eye gaze tracking apparatus three-dimensionally models the detected facial feature. For example, an AAM may be used to represent the facial feature. The three-dimensionally modeled facial feature may be represented in a three-Dimensional (3D) mesh (or 3D grid) and may be, for example, a cylindrical shape or an actual facial shape. Also, an eyeball center may be calculated based on the facial feature, and the calculated eyeball center may be included in the three-dimensionally modeled facial feature. For example, the eye gaze tracking apparatus may detect a position of an iris in a detected eye region and calculate a point, which is recessed into an eye by the radius of an eyeball, as an eyeball center. The eye center may be calculated by using an actual eyeball diameter and an actual face size of the user or by using statistics thereof. For example, the eye center may be calculated by using an average eyeball diameter and an average face size of persons. Embodiments of the present disclosure do not require a complex and time-consuming calibration.

Both the eyeball center of the left eye and the eyeball center of the right eye may be calculated. Also, the eye gaze tracking apparatus may add the calculated eyeball center as one of the facial features to the three-dimensionally modeled facial feature.

In operation 230, the eye gaze tracking apparatus tracks the three-dimensionally modeled facial feature. When a face image of the user captured by the photographing unit 105 moves, the eye gaze tracking apparatus may detect a movement of the user, track in real time a change in the facial feature that is three-dimensionally modeled in operation 220, and reflect the facial feature change, which is caused by the movement of the user, in the three-dimensionally modeled facial feature. Also, the calculated eyeball center may be included in the three-dimensionally modeled facial feature so as to be tracked together therewith. The tracking of the three-dimensionally modeled facial feature in operation 230 may include determining a facial pose. The facial pose may be a pitch, roll, and yaw of the face. The pitch, roll, and yaw of the face may be tracked in consecutive images based on the initial pitch, roll, and yaw of the face in the initially-captured image. The tracking of the three-dimensionally modeled facial feature may be performed by using an iterative 6D optical flow scheme. The three-dimensionally modeled facial feature may be constituted by hundreds of points to ensure higher accuracy.

In operation 240, the eye gaze tracking apparatus detects an iris center in the face image of the user captured by the photographing unit 105. In an embodiment, in order to reduce a process of detecting the iris center, the iris may be detected by using only the eye region detected in operation 210. Also, in an embodiment, a position of the iris center among the three-dimensionally modeled facial features may be calculated based on the iris center detected in the captured face image of the user. Also, operation 240 may include detecting a position of the iris of the left eye and a position of the iris of the right eye. Depending on the angle of the face of the user, there may be a difference between a quality of the detected iris of the left eye and a quality of the detected iris of the right eye, and a weight may be determined according to the qualities.

Figure 5:
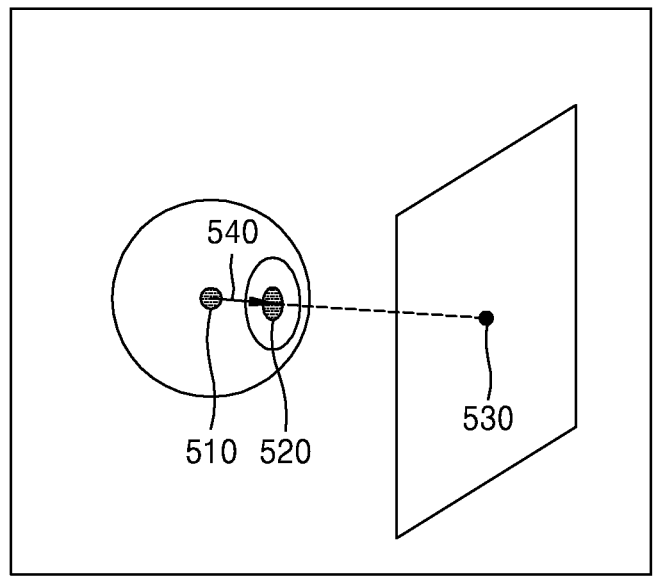
FIG. 5 illustrates an example of acquiring a gaze point by an eye gaze vector based on an eyeball center and an iris center according to an embodiment of the present disclosure.

In operation 250, the eye gaze tracking apparatus acquires an eye gaze vector based on the detected iris center and the three-dimensionally modeled facial feature. For example, referring to FIG. 5, an eye gaze vector 540 may be a line that connects a detected iris center 520 and an eyeball center 510 included in a three-dimensionally modeled facial feature. The eye gaze vector may be acquired for each of the left eye and the right eye.

In operation 260, the eye gaze tracking apparatus acquires a gaze point 530 on the display unit 103 by using the eye gaze vector. In this case, the weight determined according to the qualities of the irises of the left and right eyes detected in operation 240 may be applied to the eye gaze vector 540. For example, when the quality of the detected iris of the left eye is higher than that of the right eye, the gaze point 530 on the display unit 103 may be acquired by allocating a greater weight to the eye gaze vector 540 of the left eye. A higher-reliability gaze point 530 may be acquired by acquiring the eye gaze point 530 by allocating the weight to the eye gaze vector 540. Since a simple geometric operation is used for the eye gaze vector 540 to detect the gaze point 530, actual calibration may not be necessary.

Figure 3:
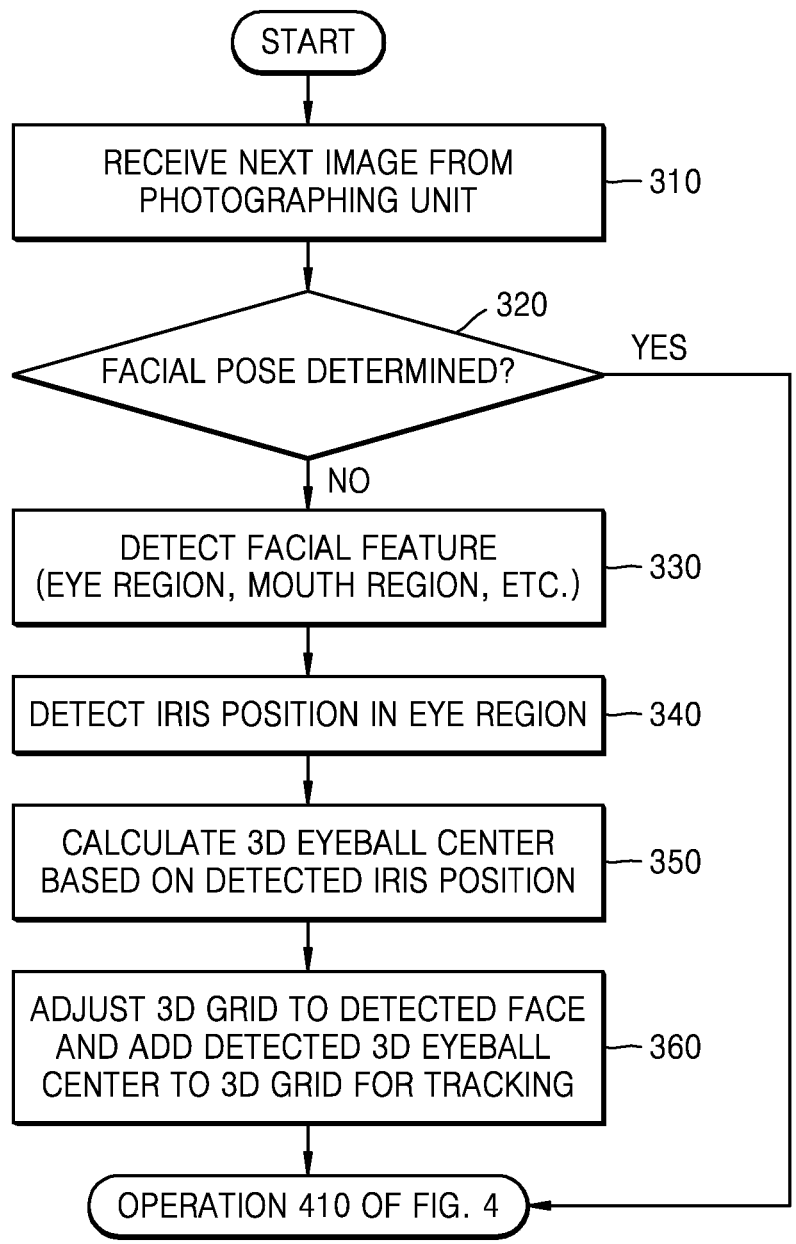
FIG. 3 is a flowchart of an eye gaze detecting method according to an embodiment of the present disclosure.

FIG. 3 is a flowchart of an eye gaze detecting method according to an embodiment of the present disclosure.

Referring to FIG. 3, in operation 310, an eye gaze detecting apparatus receives an image from the photographing unit 105.

In operation 320, the eye gaze detecting apparatus determines whether a facial pose is predetermined.

If the facial pose is not predetermined or if a new facial pose needs to be determined since there is a great difference between the predetermined facial pose and the current facial pose, the eye gaze detecting apparatus detects a facial feature in operation 330. As described above, the facial feature may be an eye region, a mouth region, or the like. An AAM may be used to detect the facial feature. This operation is used to generate an accurate 3D grid for head pose tracking and eye region detection and detect an iris region.

In operation 340, the eye gaze detecting apparatus detects a position of an iris in the eye region.

In operation 350, the eye gaze detecting apparatus calculates an eyeball center based on the detected iris position. Since the eyeball center is located in a human body in a direction from the iris to the user, the eyeball center may be calculated by using an actual head pose, face size, and eyeball diameter of the user. When the application of actual values is difficult, the eyeball center may be calculated by using statistics such as an average face size and eyeball diameter of persons. The eyeball center may be calculated with respect to each of the left eye and the right eye. Also, a single-frame calibration scheme may be used to easily calculate the eyeball center. That is, the user may be requested to gaze at a predetermined point on the display unit 103 in at least initial image photographing. Also, in an embodiment, since the user has only to gaze at one point (not a plurality of points) on the display unit 103, calibration may be performed more easily.

In operation 360, the eye gaze detecting apparatus adjusts a 3D grid to the detected facial feature and adds the calculated eyeball center to the 3D grid. For example, the 3D grid may be determined by using a facial feature detector such as an AAM. The 3D grid may have a simple cylindrical shape or may have a more delicate actual facial shape.

Also, before the adjusting of the 3D grid, an initial rotation degree of the 3D grid may be determined based on an initial pose of the face, for example, a pitch, roll, and yaw of the face. Also, an AAM may be used to estimate the initial pose of the face. The calculated eyeball center may be included in the 3D grid for the detected facial feature.

Figure 4:
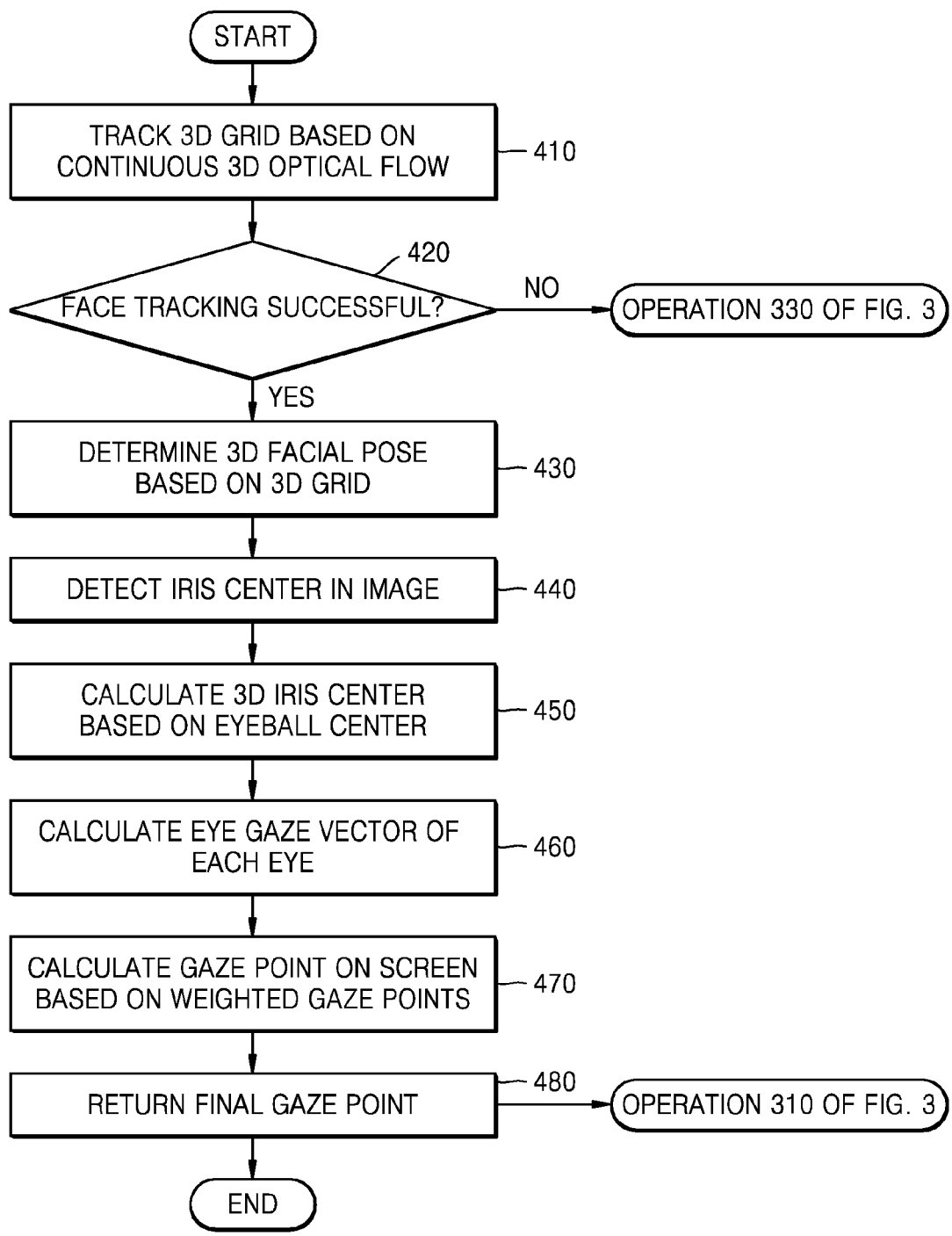
FIG. 4 is a continuation flowchart of FIG. 3, further illustrating the eye gaze detecting method according to an embodiment of the present disclosure.

If the facial pose is not determined in operation 320, or if operation 360 is completed, operation 410 of FIG. 4 is performed.

FIG. 4 is a continuation flowchart of FIG. 3, further illustrating the eye gaze detecting method according to an embodiment of the present disclosure.

Referring to FIG. 4, in operation 410, the eye gaze detecting apparatus tracks the 3D grid by using a continuous 6D optical flow. For example, the 3D grid may be tracked based on each of the captured images. That is, a continuous face change in the captured image may be reflected in the 3D grid. Also, in addition to the 3D grid, the position of the eyeball center included in the 3D grid may be tracked based on each image. That is, the eye gaze tracking apparatus may track the position of the eyeball center according to the continuous face change in the captured image. Since the 3D grid, including hundreds of points, is tracked in operation 410, the 3D grid may be tracked more accurately.

In operation 420, the eye gaze detecting apparatus determines whether face tracking is successful. In an embodiment, whether face tracking is successful may be determined based on whether a difference between the captured face image and the 3D grid is greater than a threshold value. When face tracking is successful, operation 430 is performed, and when face tracking is not successful, operation 330 of FIG. 3 is performed to detect the facial feature again.

In operation 430, a 3D facial pose is determined based on the 3D grid that is tracked. In operation 440, an iris center is detected in the image. The iris center may be detected with respect to each of the left eye and the right eye. The detecting of the iris center may be performed based on subpixel accuracy from a general HD webcam in typical brightness. That is, the iris center may be detected more accurately than the size of a single pixel of the general HD webcam. For example, the detecting of the iris center may be performed by, but not limited to, using Hough Voting and a Daugman's integro-differential operator. A technique used to detect the iris center is not limited thereto, and the iris center may be detected by using any scheme that ensures sufficient subpixel accuracy and speed.

In operation 450, a 3D iris center is calculated by using the iris center detected in the image. For example, the iris center may be calculated on the 3D grid.

In operation 460, an eye gaze vector is calculated by using the facial pose, the eyeball center, and the iris center. The eye gaze vector may be calculated by a line extending from the eyeball center to the iris center and may be calculated with respect to both eyes.

In operation 470, a gaze point on the display unit 103 is calculated based on a weighted gaze point. The weighted gaze point may be based on the weight determined in operation 240. When the gaze point is calculated by applying the weight, since the weight is allocated to higher-reliability information, a more accurate gaze point may be calculated. The eye gaze vector is used to calculate the gaze point.

Thereafter, the final gaze point is output at operation 480, and then, operation 310 of FIG. 3 is performed again.

Figure 6:
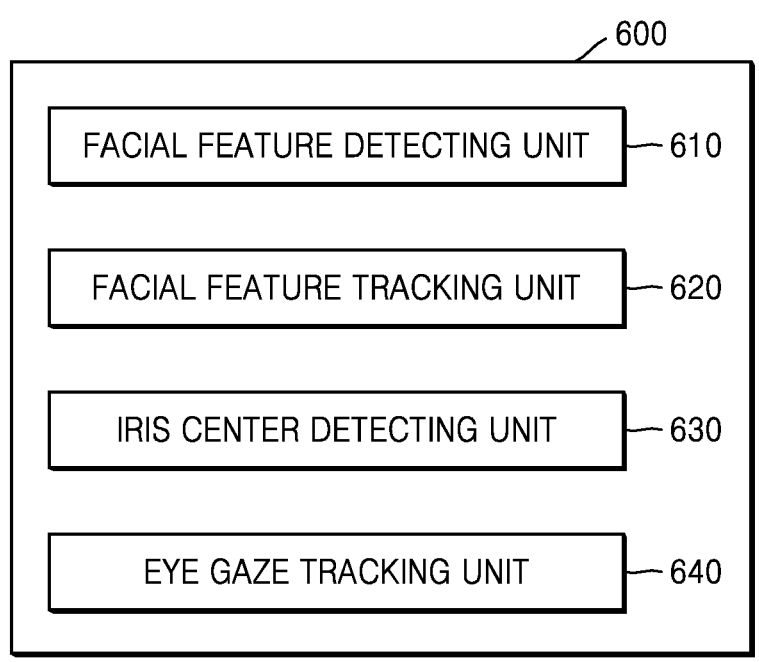
FIG. 6 illustrates an example configuration of an eye gaze tracking apparatus according to an embodiment of the present disclosure.

FIG. 6 illustrates an example of the configuration of an eye gaze tracking apparatus 600 according to an embodiment of the present disclosure. Referring to FIG. 6, the eye gaze tracking apparatus 600 may include a facial feature detecting unit 610, a facial feature tracking unit 620, an iris center detecting unit 630, and an eye gaze tracking unit 640.

The facial feature detecting unit 610 detects a facial feature in a captured initial image.

The facial feature tracking unit 620 three-dimensionally models the detected facial feature and tracks the three-dimensionally modeled facial feature in consecutively captured images.

The iris center detecting unit 630 detects an iris center in the consecutively captured images.

The eye gaze tracking unit 640 acquires an eye gaze vector based on the tracked three-dimensionally modeled facial feature and the detected iris center and acquires a gaze point on a display unit based on the eye gaze vector.

Figure 7:
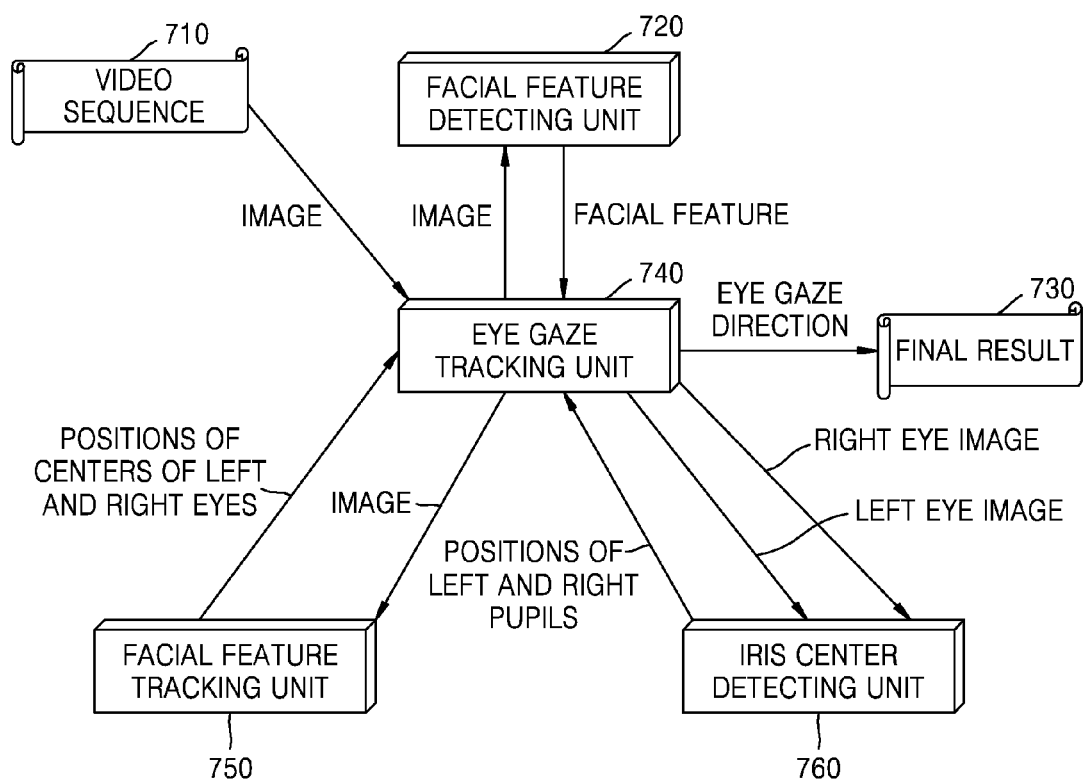
FIG. 7 illustrates an example operation of the eye gaze tracking apparatus according to an embodiment of the present disclosure.

FIG. 7 illustrates an example of the operation of the eye gaze tracking apparatus 600 according to an embodiment of the present disclosure. Since the eye gaze tracking method has been described above with reference to FIGS. 2 to 4 in detail, only schematic operations thereof will be described below.

Referring to FIG. 7, a facial feature detecting unit 720 receives an initial image from a video sequence 710 input from a photographing unit (e.g., a camera or a video recorder) and detects a facial feature. Although FIG. 7 illustrates that the initial image is received through an eye gaze tracking unit 740, embodiments of the present disclosure are not limited thereto. An AAM may be used to detect the facial feature. The detected facial feature is provided to other devices. For example, the detected facial feature may be provided to other devices through the eye gaze tracking unit 740. The facial feature detecting unit 720 does not detect a facial feature in subsequent images. However, when failing to track a facial feature in an eye gaze tracking process, the facial feature detecting unit 720 receives an image again and detects a facial feature.

The eye gaze tracking unit 740 may control other devices and collect information from other devices. When receiving information from the facial feature detecting unit 720, the eye gaze tracking unit 740 may transmit the information and consecutive images to a facial feature tracking unit 750. After the images are transmitted to the facial feature tracking unit 750, a facial feature may be tracked from each of the consecutive images and the tracked facial feature may be transmitted to the eye gaze tracking unit 740.

The facial feature tracking unit 750 tracks a facial feature based on the received information and the consecutive images. The facial feature tracking unit 750 may also track an eye region and an eyeball center. When a difference that is greater than a threshold value exists between the previous image and the subsequent image, the facial feature tracking unit 750 may determine that the facial feature tracking is unsuccessful. When the facial feature tracking is unsuccessful, the facial feature tracking unit 750 may notify this fact to the eye gaze tracking unit 740. In this case, the eye gaze tracking unit 740 may control the facial feature detecting unit 720 to detect a facial feature again. When the facial feature tracking is successful, the facial feature tracking unit 750 may provide an eye position to an iris center detecting unit 760 through the eye gaze tracking unit 740.

The iris center detecting unit 760 detects a subpixel iris center, wherein detecting a subpixel iris center is described in more detail below.

Upon detecting information, the eye gaze tracking unit 740 calculates an eye gaze vector. The eye gaze vector may be calculated with respect to both eyes, and a weight may be applied to the eye gaze vector according to the iris detection quality. As described above, the eye gaze tracking unit 740 may calculate a gaze point on the display unit based on the weighted eye gaze vectors and the 3D position of the display unit. Also, the calculated gaze point may be output as a final result 730.

Facial Feature Tracking

In a basic algorithm for facial pose tracking in facial feature tracking, an optical flow change for a 3D face model may be used. The 3D face model may be a semicylinder. The 3D face model may be tracked by a general 6D Lukas-Kanade approach. The 6D Lukas-Kanade approach will be described below in brief.

It is assumed that an image I(u,t) is observed at a time t. Herein, u=(u,v) is a pixel in an image. It follows that u shifts to u'=F(u,μ) at time (t+1). Herein, μ is a motion parameter vector and may be obtained by Equation 1.

$$\mu=[\omega_x, \omega_y, \omega_z, t_x, t_y, t_z]$$ Equation 1

F(u,μ) is a parametric motion model and maps u to a new position u'. When there is no change in illumination, Equation 2 will be satisfied.

$$I(F(u,\mu),t+1)=I(u,t)$$ Equation 2

When a Lucas-Kanade method is applied to Equation 2 and a Taylor expansion is used, a motion vector formed of a Taylor expansion expressed as Equation 3 may be calculated.

$$\mu = -\left(\sum_\Omega (w(I_u F_\mu)^T (I_u F_\mu))\right)^{-1} \sum_\Omega (w(I_t (I_u F_\mu)^T))$$ Equation 3

Herein, $I_t$ is a temporal image gradient, $I_u$ is a spatial image gradient, $F_\mu$ is a partial derivative of F with respect to μ at μ=0, and w is weights of pixels tracked within a range of [0,1].

An image projection u of X=[x,y,z,1]T under a perspective projection at a time (t+1) is expressed as Equation 4.

$$u(t+1) = \begin{bmatrix} x - y\omega_z + z\omega_y + t_x \\ x\omega_z + y - z\omega_x + t_y \end{bmatrix} \cdot \frac{f_L}{-x\omega_y + y\omega_x + 2 + t_z}(t)$$ Equation 4

Herein, $f_L$, is a focal length.

Equation 4 is a parametric motion model F used in Equation 2. Also, $F_\mu$ at μ=0 is expressed as Equation 5.

$$F_{\mu|\mu=0} = \begin{bmatrix} -xy & x^2+y^2 & -yz & z & 0 & -x \\ -(x^2+z^2) & xy & xz & 0 & z & -y \end{bmatrix} \cdot \frac{f_L}{z^2}(t)$$ Equation 5

After algorithm iteration, an incremental transformation is calculated by using μ and may be configured to obtain a final transformation matrix. A new facial pose may be calculated from a combination of a current transformation and a previous pose.

Eyeball Center Detection and Tracking

Eyeball center detection may be performed at an initial stage. The user may be requested to gaze at a camera straight in the face (or to gaze at another point of known coordinates). After detecting a face and an eye region, the facial feature detecting unit 720 detects an accurate iris center. An eyeball center position with respect to a given eyeball radius r and a 3D iris center position $p_{iris}(x,y,z)$ is defined as Equation 6.

$$P_{eye\ center}=P_{iris}(x,y,z)+(0,0r)$$ Equation 6

Herein, $P_{eye\ center}$ denotes an eyeball center.

That is, $P_{eye\ center}$ is defined such that the eyeball center is located at a point that is shifted by the eyeball radius from the pupil along an axis passing through the camera and the iris center.

Figure 8:
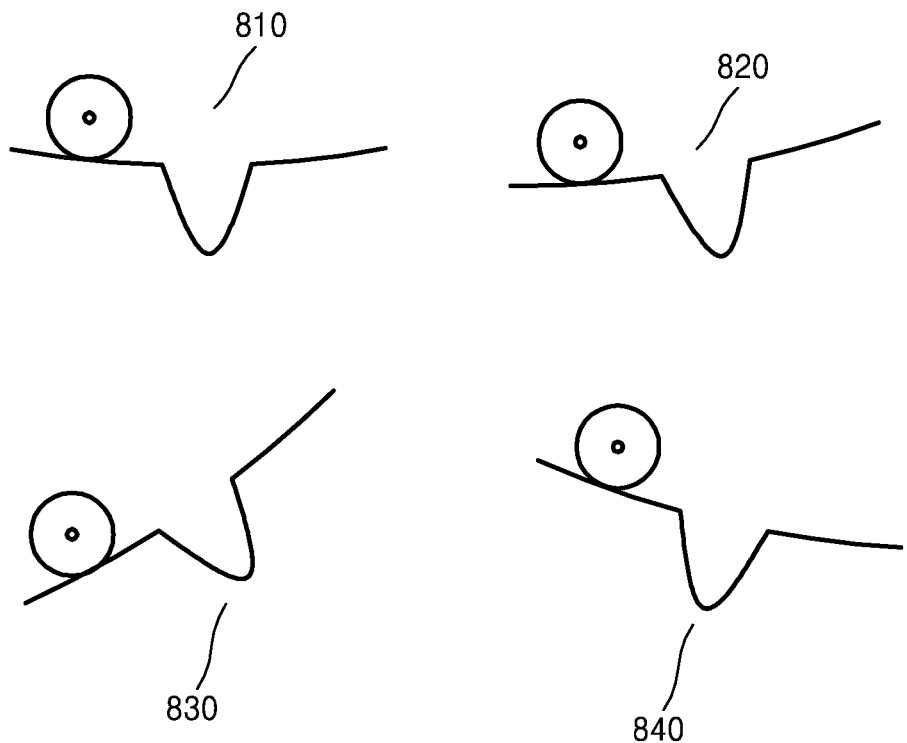
FIG. 8 illustrates an example in which a relative position between an eyeball center and a face does not change even when the face moves according to an embodiment of the present disclosure.

The absolute position of the eyeball center changes in consecutive images. However, the relative position of the eyeball center with respect to the entire face is fixed. This may be seen from FIG. 8. That is, points in circles of reference numerals 810, 820, 830, and 840 represent eyeball centers, and it may be seen that the absolute position of the eyeball center changes according to the movement of the face. However, it may be seen that the eyeball center is always constant with respect to the face.

In a 6D Lukas-Kanade approach for tracking a 3D face model, several algorithm modifications are performed. Also, along with the modification of an original algorithm, the face is modeled in a 3D grid.

First, the 3D grid may be implemented in a semicylinder of 20×20 points. Also, for example, the 3D grid may be implemented in a denser 3D grid of 40×40 points. In this case, the accuracy of tracking increases, but the performance thereof is degraded. Also, the face may be modeled in a cylindrical shape or in an actual facial shape. Also, the three-dimensionally modeled face may be modeled as a predefined model, but it may be applied according to the actual face of each user by using a predetermined calibration scheme (e.g., structure-from-motion).

The positions of points are not uniformly disposed. In an initial stage, a face region may be divided into equal squares of 20×20. However, in each square, the best points to track (i.e., the edges of the square) may be selected. This technique may use, for example, a Flock of Trackers approach.

A weight of each point may be calculated by Equation 7 as a difference between the value of a subpixel image at a given point in a current image and the value of the point in a previous image.

$$w = e^{-\frac{|I_c - I_p|}{\alpha}}$$ Equation 7

Herein, $I_c$ is a projection of a point in the current image, $I_p$ is a projection of a point in the previous image, and α is a defined component that is experimentally calculated. A gradient weight or a pixel density weight may not be considered. An image pyramid may be useful up to a resolution of about 320×240.

2D Iris Center Detection

The detection of the iris center is based on the modification of two algorithms, which have been described as the radial symmetry transform and the Daugman's integro-differential operator. The first algorithm may provide approximate detection of the iris center, and the second algorithm may increase the accuracy of the first algorithm.

Figure 9:
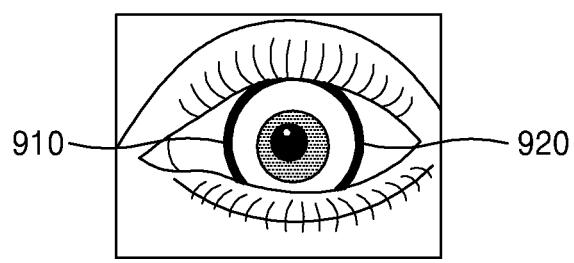
FIG. 9 illustrates an example of an iris edge having a vertical direction according to an embodiment of the present disclosure.

Referring to FIG. 9, approximate detection of the iris center is based on a voting technique, similar to a Circle Hough Transform (CHT). The approximate iris detection algorithm is based on the premise that the edge of the iris is a turning point between a bright inner region of the iris and a dark inner region of the iris. The accurate radius of the iris is not known, but the potential range of the iris (e.g., about 7 pixels to about 13 pixels) may be estimated based on the size of the face. The left and right edges of the iris are considered because the upper and lower edges of the iris may be covered by the skin around the eye. Thus, the edges of the iris to be considered are vertical portions corresponding to reference numerals 910 and 920, as illustrated in FIG. 9.

An approximate iris center detection algorithm is performed through the following process: First, for an image having a width w and a height h, a 2D w*h voting binary table H is generated and it is completely filled with '0'. Then, a first derivative of x and y is calculated with respect to each of image pixels $d_x$ and $d_y$. The size of the edge of each pixel is calculated by Equation 8.

$$M=\sqrt{d_x+d_y}$$ Equation 8

The edge vector of each pixel is calculated by Equation 9.

$$v=[d_x/M;\ d_y/M] \quad \text{Equation 9}$$

When a size M of each pixel is equal to or greater than a predetermined threshold value, a gradient direction is sufficiently vertical. When the vector is directed from a bright side to a dark side, a.) for each considered radius r, an iris center estimated as a point concluded from the movement from a considered point is calculated by a vector $[x', y']=v*r$.

b.) each considered radius r, a corresponding H binary $[x', y']$ is increased by an M value of a pixel.

H binary cells corresponding to all pixels are divided by an average image value of the points closest to the points of pixels. Since the dividing of the H binary cells corresponding to all pixels is unfavorable for a high-brightness pupil region located in the middle of the iris, the pupil region should be dark. For example, Gaussian Blurring is used to expand the H binaries. A point of the H binaries having the highest value is selected as an approximate iris center.

The voting technique for approximate iris center detection may separately generate H tables for the considered radius and may select the highest value among all responses. Accordingly, the accuracy of the algorithm may be increased.

Accurate iris center detection is based on a Daugman's integro-differential operator. An iris model is generated by selecting 64 or 32 points (e.g., pixels) at an iris boundary corresponding to the reference numerals 910 and 920 of FIG. 9. In this case, horizontal portions of the iris boundary (other than the portions corresponding to the reference numerals 910 and 920) is disregarded because they may be covered by the skin around the eye as described above. This algorithm depends on the fact that there is a very high color contrast at the iris boundary. When there is no strong light reflection, a very high color contrast exists at the iris boundary regardless of the color of the iris.

In an embodiment, accurate iris center detection may be performed by a subpixel scheme at a higher resolution than the pixel. A differential function response is calculated for all parameter substitutions approaching approximate estimation.

In an embodiment, anchoring points (x,y) are, for example, about +−3 pixels in x and y directions at intervals of about 0.25 pixel. A radius r is, for example, about +−2 pixels at intervals of about 1 pixel. A vertical stretch s is a ratio between the maximum height of the iris and the maximum weight. For example, the vertical stretch s may be used to allow the imitation of the simplest perspective projection as an ellipse with coefficients ranging from about 0.9 to about 1.1 at intervals of about 0.05.

A differential function for each set of parameters x, y, r, and s may be calculated by generating an ellipse with parameters that are separately defined with respect to the left and right iris boundaries.

1. Values of pixels are calculated by parameters $S_{bright}=(x, y, r+0.5, s)$ with respect to the outside of an elliptical portion.

2. Values of pixels are calculated by parameters $S_{dark}=(x, y, r-0.5, s)$ with respect to the inside of an elliptical portion.

3. Differential values corresponding to outer and inner elliptical points are calculated. $d = S_{dark} S_{bright}$ 4. The results are sorted in descending order.

5. An average of ¾ of all sorted differential values is calculated (by selecting the greatest values).

6. Derived values are returned.

The results from the left and right boundaries of the iris are added to give a final differential result for given parameters. The greatest differential value may be selected from all parameter substitutions. In order to increase the algorithm performance speed, the algorithm may be performed from an approximate scheme to an accurate scheme.

3D Iris Center Detection

A 3D position $(X_c, Y_c, Z_c)$ of the eyeball center, a radius R of the eyeball, and a 2D position $(u_x, u_y)$ of the iris may be drawn to a 3D position of the iris. When it is assumed that the iris center is located at a surface on the eyeball and the eyeball is spherical, a simple projection model may be assumed as Equations 10 to 12.

$$R^2 = (X-X_c)^2 + (Y-Y_c)^2 + (Z-Z_c)^2 \quad \text{Equation 10}$$

$$u_x = X\frac{f_L}{z} \quad \text{Equation 11}$$

$$u_y = Y\frac{f_L}{z} \quad \text{Equation 12}$$

Herein, X, Y, and Z are 3D coordinates of the iris and $f_L$ is a known focal length of the camera. Since three Equations 10 to 12 have three unknown quantities, three unknown quantities may be easily obtained. Sine Equations 10 to 12 are quadratic equations, possible results on a spherical surface may be obtained and a value closest to the camera will be a final result. Also, a general elliptical (not spherical) equation may be used to compensate for the anatomical non-uniformity of an eyeball shape of a person and to improve the quality of the algorithm.

Presumptions for Eye Gaze Estimation

In order to obtain a substantial gaze point on the display unit, a coordinate system is calibrated. In order to avoid difficulty in a calibration process, several presumptions may be made on the attributes of the face.

Presumption 1. A distance between both eyes may be fixed at about 6.0 cm to about 6.5 cm or may be calculated in calibration.

Presumption 2. A relation between a model distance z and a face size in pixels may be known (calculated for each camera).

Presumption 3. An eyeball radius may be fixed at about 12 mm and may be calculated for each user during calibration.

Presumption 4. An initial relative shift between a grid surface and an eyeball in a z axis may be known and may be set for each user.

Presumptions 1 and 2 provide approximate estimation of a model coordinate system transform with respect to a real coordinate system. Presumption 3 defines a region covered by the movement of all eyes. Presumption 4 may be used to accurately track the eyeball even when the head moves in any way.

As described above, the embodiments of the present disclosure may be implemented inexpensively and easily. Also, even when there is a movement of the head, the embodiments of the present disclosure may operate without problems; and when there is no obstacle to the movement of the head under good light conditions, an accuracy of at least about 1.5 deg. may be achieved in iris direction measurements and an accuracy of at least about 2.5 deg. may be achieved in face direction measurements. Also, when there is a small movement of the head, a relative accuracy of about 3 deg. may be allowed to increase competitiveness.

It should be understood that the embodiments described therein should be considered in a descriptive sense only and not for purposes of limitation. Descriptions of features or aspects within each embodiment should typically be considered as available for other similar features or aspects in other embodiments.

While the present disclosure has been shown and described with reference to the various embodiments thereof, it will be understood by those skilled in the art that various changes in form and details may be made therein without departing from the spirit and scope of the present disclosure as defined by the appended claims and their equivalents.

What is claimed is:

1. A method of tracking an eye gaze, the method comprising:
    detecting a facial feature in a captured initial image;
    three-dimensionally modeling the detected facial feature;
    tracking the three-dimensionally modeled facial feature in consecutively captured images;
    detecting an iris center in the consecutively captured images;
    acquiring an eye gaze vector based on the tracked three-dimensionally modeled facial feature and the detected iris center; and
    acquiring a gaze point on a display unit based on the eye gaze vector.

2. The method of claim 1, wherein the detecting of the facial feature comprises displaying a message requesting a user to gaze at a certain point of the display unit.

3. The method of claim 1, wherein the three-dimensional modeling of the detected facial feature comprises:
    calculating an eyeball center based on the detected facial feature; and
    three-dimensionally modeling the facial feature including the calculated eyeball center.

4. The method of claim 3, wherein the calculating of the eyeball center is performed based on statistics of a facial size and an eyeball diameter.

5. The method of claim 1, wherein the tracking of the three-dimensionally modeled facial feature comprises:
    determining a facial pose based on the three-dimensionally modeled facial feature; and
    tracking the facial pose.

6. The method of claim 1, wherein the detecting of the iris center comprises detecting the iris center by using only an eye region of the three-dimensionally modeled facial feature.

7. The method of claim 1, wherein the detecting of the iris center comprises calculating a position of the iris center on the three-dimensionally modeled facial feature.

8. The method of claim 1, wherein the detecting of the iris center comprises:
    detecting a position of an iris of a left eye and a position of an iris of a right eye; and
    determining a weight by estimating a quality of the detected position of the iris of the left eye and a quality of the detected position of the iris of the right eye.

9. The method of claim 8, wherein,
    the acquiring of the eye gaze vector comprises determining an eye gaze vector of the left eye and an eye gaze vector of the right eye, and
    the acquiring of the gaze point on the display unit comprises applying the weight based on the estimated quality of the detected position of the iris of the left eye and the estimated quality of the detected position of the iris of the right eye to the eye gaze vector of the left eye and the eye gaze vector of the right eye, respectively.

10. The method of claim 1, wherein the three-dimensional modeling of the detected facial feature comprises modeling the facial feature as a three-dimensional grid by using an Active Appearance Model (AAM).

11. The method of claim 1, wherein the detecting of the facial feature is performed by using an AAM.

12. An apparatus of tracking an eye gaze, the apparatus comprising:
    a facial feature detecting unit configured to detect a facial feature in a captured initial image;
    a facial feature tracking unit configured to three-dimensionally model the detected facial feature and to track the three-dimensionally modeled facial feature in consecutively captured images;
    an iris center detecting unit configured to detect an iris center in the consecutively captured images; and
    an eye gaze tracking unit configured to acquire an eye gaze vector based on the tracked three-dimensionally modeled facial feature and the detected iris center and to acquire a gaze point on a display unit based on the eye gaze vector.

13. The apparatus of claim 12, wherein the facial feature detecting unit is further configured to display a message requesting a user to gaze at a certain point of the display unit when detecting the facial feature.

14. The apparatus of claim 12, wherein the facial feature tracking unit is further configured to calculate an eyeball center based on the detected facial feature and to three-dimensionally model the facial feature including the calculated eyeball center.

15. The apparatus of claim 14, wherein the facial feature tracking unit is further configured to calculate the eyeball center based on statistics of a facial size and an eyeball diameter.

16. The apparatus of claim 12, wherein the facial feature tracking unit is further configured to determine a facial pose based on the three-dimensionally modeled facial feature and to track the facial pose.

17. The apparatus of claim 12, wherein the iris center detecting unit is further configured to detect the iris center by using only an eye region of the three-dimensionally modeled facial feature.

18. The apparatus of claim 12, wherein the iris center detecting unit is further configured to calculate a position of the iris center on the three-dimensionally modeled facial feature.

19. The apparatus of claim 12, wherein the iris center detecting unit is further configured to detect a position of an iris of a left eye and a position of an iris of a right eye and to determine a weight by estimating a quality of the detected position of the iris of the left eye and a quality of the detected position of the iris of the right eye.

20. The apparatus of claim 19, wherein the eye gaze tracking unit is further configured to determine an eye gaze vector of the left eye and an eye gaze vector of the right eye and to acquire the gaze point on the display unit by applying the weight based on the estimated quality of the detected position of the iris of the left eye and the estimated quality of the detected position of the iris of the right eye to the eye gaze vector of the left eye and the eye gaze vector of the right eye, respectively.

21. The apparatus of claim 12, wherein the facial feature tracking unit is further configured to model the facial feature as a three-dimensional grid by using an Active Appearance Model (AAM).

22. The apparatus of claim 12, wherein the facial feature detecting unit is further configured to detect the facial feature by using an AAM.

23. A non-transitory computer-readable recording medium configured to store computer-readable instructions that, when executed by a computer, perform the method of claim 1.

* * * * *